US006609841B1

United States Patent
Wilde et al.

(10) Patent No.: US 6,609,841 B1
(45) Date of Patent: Aug. 26, 2003

(54) LOW NOISE OPTICAL STORAGE SYSTEM BASED ON AN OPTICAL POLARIMETRIC DELAY LINE

(75) Inventors: Jeffrey P. Wilde, Los Gatos, CA (US); Alexander Tselikov, Fremont, CA (US); Yongwei Zhang, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/276,082

(22) Filed: Mar. 25, 1999

Related U.S. Application Data

(60) Provisional application No. 60/111,470, filed on Dec. 9, 1998, provisional application No. 60/108,398, filed on Nov. 13, 1998, provisional application No. 60/088,192, filed on Jun. 5, 1998, provisional application No. 60/081,227, filed on Apr. 9, 1998, and provisional application No. 60/079,903, filed on Mar. 30, 1998.

(51) Int. Cl.$^7$ .................................................. G02B 5/30
(52) U.S. Cl. .................... 398/159; 369/14; 369/112; 360/114
(58) Field of Search .................... 369/14, 112; 360/114; 359/156

(56) References Cited

U.S. PATENT DOCUMENTS

| | | | | |
|---|---|---|---|---|
| 3,900,247 A | * | 8/1975 | Zaky | 359/247 |
| 5,245,491 A | * | 9/1993 | Horie et al. | 360/114 |
| 5,434,501 A | * | 7/1995 | Esman et al. | 324/96 |
| 5,495,366 A | * | 2/1996 | Esman et al. | 395/495 |
| 5,822,100 A | * | 10/1998 | Robinson et al. | 359/161 |
| 5,850,375 A | * | 12/1998 | Wilde et al. | 369/14 |
| 5,930,414 A | * | 7/1999 | Fishman et al. | 385/11 |
| 6,271,952 B1 | * | 8/2001 | Epworth | 359/161 |

FOREIGN PATENT DOCUMENTS

| | | | |
|---|---|---|---|
| GB | 2 175 087 | 11/1986 | |
| WO | WO9425883 | 11/1994 | G02B/5/30 |
| WO | WO9809392 | 3/1998 | H04B/10/135 |

* cited by examiner

Primary Examiner—Leslie Pascal
Assistant Examiner—David C Payne
(74) Attorney, Agent, or Firm—Robert P. Lenart, Esq.; Pietragallo, Bosick & Gordon

(57) ABSTRACT

A system and method for achieving, while using a multimode diode laser and polarization-maintaining fibers, high signal-to-noise ratio in a magneto optical storage system. In particular, the system splits an incoming main light signal into two orthogonal polarization states, which then propagate over different distances before recombining. By pulsing the laser on and off at a high frequency and choosing an appropriate path difference for the polarization states, which is dependent upon the modulation frequency of the laser, the system eliminates first-order spectral polarization noise arising from a potential error in a key optical component.

30 Claims, 10 Drawing Sheets

LOW NOISE OPTICAL STORAGE SYSTEM BASED ON AN OPTICAL POLARIMETRIC DELAY LINE

RELATED APPLICATIONS

This application claims the benefit under 35 U.S.C. §119 (e) to U.S. Provisional Application Ser. No. 60/081,227, Jeffrey P. Wilde, et al., filed on Apr. 9, 1998, entitled "Low-Noise Optical Storage System Based On An Optical Polarimetric Delay Line," U.S Provisional Application 60/079,903 entitled "Optical Drive Utilizing Low Birefringence Fiber," filed Mar. 30, 1998, U.S. Provisional Application 60/088,192 entitled "Laser Phase Noise Minimization In Optical Drive," filed Jun. 5, 1998, U.S. Provisional Application 60/108,398 entitled "Optical Head Design Eliminating Fiber End Back Reflection" filed Nov. 13, 1998, U.S. Provisional Application 60/111,470 entitled "Optical Fiber Coupler Using A Spliced Polarization-Maintaining Fiber, filed Dec. 9, 1998, all of which are incorporated by reference herein in their entirety. This application also is related to U.S. application Ser. No. 08/745,095, Jeffrey P. Wilde, et al., filed on Nov. 7, 1996, entitled "Optical System and Method Using Optical Fibers For Storage And Retrieval Of Information," which is incorporated by reference in its entirety herein.

BACKGROUND OF INVENTION

1. Field of Technology

The present invention generally relates to optical systems. More specifically, the present invention relates to noise reduction in the transmission of optical signals.

2. Description of Background of Invention

Conventional data storage systems utilize billions of magnetically recorded imprints (bits) on a platter (media) surface to store oppositely polarized (e.g., positive or negative) data bits. These complimentary magnetic dipoles (which are parallel to the disk surface) represent a logic state of either a '1' or a '0'. Based upon the industry's current areal density (e.g., a few Gbits per in$^2$) growth rate, such conventional disk drives are approaching areal densities as high as 20 Gbits/in$^2$, which results in potential problems associated with a superparamagnetic limit. In particular, this physical limit causes oppositely-polarized domains that reside in very close proximity to one another to degrade, thereby causing data corruption problems.

To avoid this potential technological hurdle, an alternative storage technology utilizing a magneto-optical (MO) storage system is used. Such MO storage systems are, in principle, able to attain areal densities beyond approximately 40 Gbits/in$^2$ without confronting the superparamagnetic limit. However, such an alternative technology results in the need to overcome new technological challenges, such as the effects of laser noise within the system. In particular, spectral polarization noise (SPN) comprising both mode partition noise (MPN) and laser phase noise must be minimized through careful optical system design.

For example, by propagating a multi-longitudinal mode laser light (e.g., from a Fabry-Perot diode laser) through a frequency selective polarization-maintaining (PM) fiber system, which contains slight unavoidable optical misalignment errors, SPN can develop, thereby increasing the likelihood of data corruption in a main light signal, which serves as the data conduit between an MO medium and a detection module. One partial solution for minimizing SPN is to utilize a single-mode (e.g., single-frequency) distributed feedback (DFB) laser, which does not generate these multiple modes within the system, thereby avoiding the effects of MPN. However, DFB lasers which operate in the red spectral range and at high power levels currently are not readily available on the commercial market. Although use of a DFB laser eliminates MPN, laser phase noise may still exit. In addition, since multimode laser diodes are considerably less expensive than DFB lasers, multimode lasers are the preferred type of laser source for MO storage systems.

What is needed is a system and method that utilizes a multimode diode laser and minimizes the effects of SPN within the MO storage system.

SUMMARY OF INVENTION

Accordingly, the present invention overcomes the deficiencies of the prior art by providing a system and method that minimizes the first-order spectral polarization noise (SPN) by time shifting polarization components of a parasitic light signal away from a main light signal. In particular, a preferred embodiment of the system includes a multimode laser, a leaky beam splitter (LBS), a first half wave plate (HWP1), a second half wave plate (HWP2), a polarimetric delay line (PDL), a polarization-maintaining (PM) fiber, a first quarter wave plate (QWP1), a second quarter wave plate (QWP2) and a differential detection module. A parasitic light signal is generated by non-ideal properties of the optical system.

The multimode laser generates the main light signal, which is used as a read signal for carrying the current logic state from a specific location on the MO medium to the differential detection module. The laser is modulated on and off at a radio frequency, the particular value of which is determined by the optical path lengths associated with the PDL and the PM fiber. The PDL and the PM fiber are part of a continuous birefringent optical conduit for the propagation of the main light signal to and from the MO medium.

The HWP1 and HWP2 in conjunction with the QWP1 alter the polarization of the main light signal to ensure that the first and second polarization components of the main light signal propagate along each delay path length of the PDL and each axis of the PM fiber. By propagating along one delay path length and axis on the forward path, and the opposing delay path length and axis on the return path from the MO medium, the two polarization components of the main light signal will have a net optical path difference of zero in the absence of an MO signal. In the presence of an MO signal, or magnetic Kerr effect, a small phase shift is introduced between the two polarization components of the main signal, making the net optical path difference slightly nonzero. To minimize SPN caused by retardation and/or orientation errors of QWP1, the PDL time shifts one half of the parasitic light signal ahead and the other half behind the main light signal so as to preclude coherent interaction between the parasitic and main optical pulse trains.

The LBS, which allows linearly polarized light to enter the PDL and the PM fiber on the forward path, reflects toward the differential detector on the return path, part of this polarized mode and most of the orthogonally polarized mode (generated by the magnetic Kerr effect) of the main signal. In addition, the LBS reflects a portion of the corresponding time-shifted parasitic signal toward the differential detection module. The QWP2 modifies the phase between the two polarization components of the reflected main light signal to ensure that the logic state of the data signal carried by the main light signal is properly detected by the differential detection module.

DETAILED DESCRIPTION OF PREFERRED EMBODIMENTS

Preferred embodiments of the present invention are now described with reference to Figures where like reference numbers indicate identical or functionally similar elements and the left most digit of each reference number corresponds to the Figure in which the reference number is first used.

Figure 1:
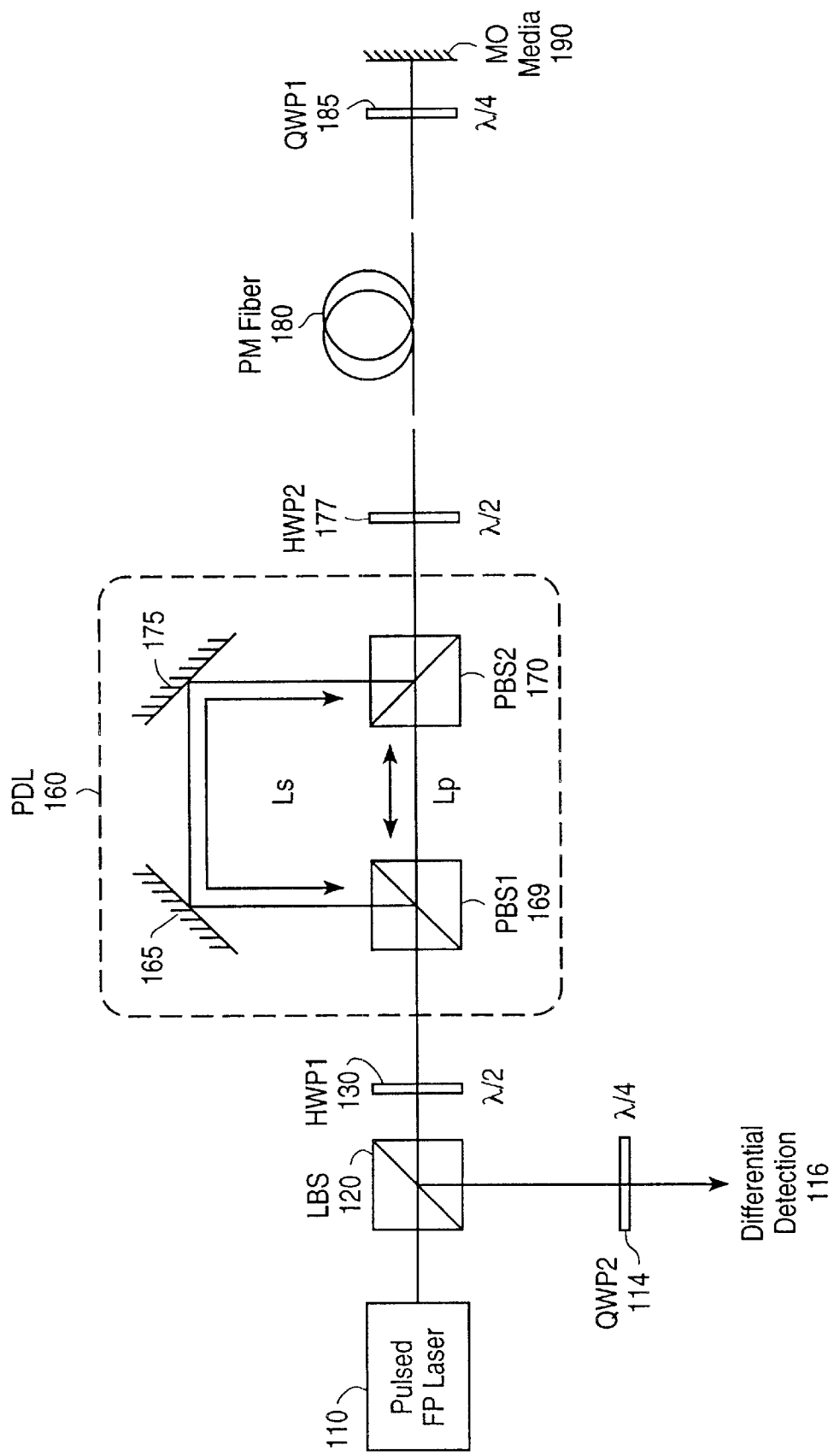
FIG. 1 illustrates an overall system of a preferred embodiment of the present invention.

FIG. 1 illustrates a low noise optical storage system 100 of a preferred embodiment of the present invention, which utilizes a flying optical head technology (not illustrated) (e.g., optically-assisted Winchester (OAW) disk drives, as discussed in U.S. application Ser. No. 08/745,095, Jeffrey P. Wilde, et al., entitled "Optical System and Method Using Optical Fibers For Storage And Retrieval Of Information", which, as previously mentioned, is incorporated by reference in its entirety herein, to read polarized signals from a magneto-optical (MO) media. The system 100 includes a multimode laser 110, a leaky beam splitter (LBS) 120, a first half-wave plate (HWP1) 130, a second half-wave plate (HWP2) 177, a first quarter wave plate (QWP1) 185, a second quarter wave plate (QWP2) 114, a polarimetric delay line (PDL) 160, a plurality of polarization-maintaining (PM) fibers 180, a plurality of magneto-optical (MO) media 190 and a differential detection module 116. To avoid unneeded complexity, only one PM fiber 180 and one MO medium 190 will be illustrated and primarily discussed. One skilled in the art will recognize that the same principles that apply to one PM fiber 180 and one MO medium 190 applies to the multiple PM fibers 180 and multiple MO medium 190. In addition, one skilled in the art will recognize that the same principles, which apply to a preferred embodiment, also will apply to alternative embodiments, such as a fiber optic current sensor, where laser noise also must be minimized.

Figure 2:
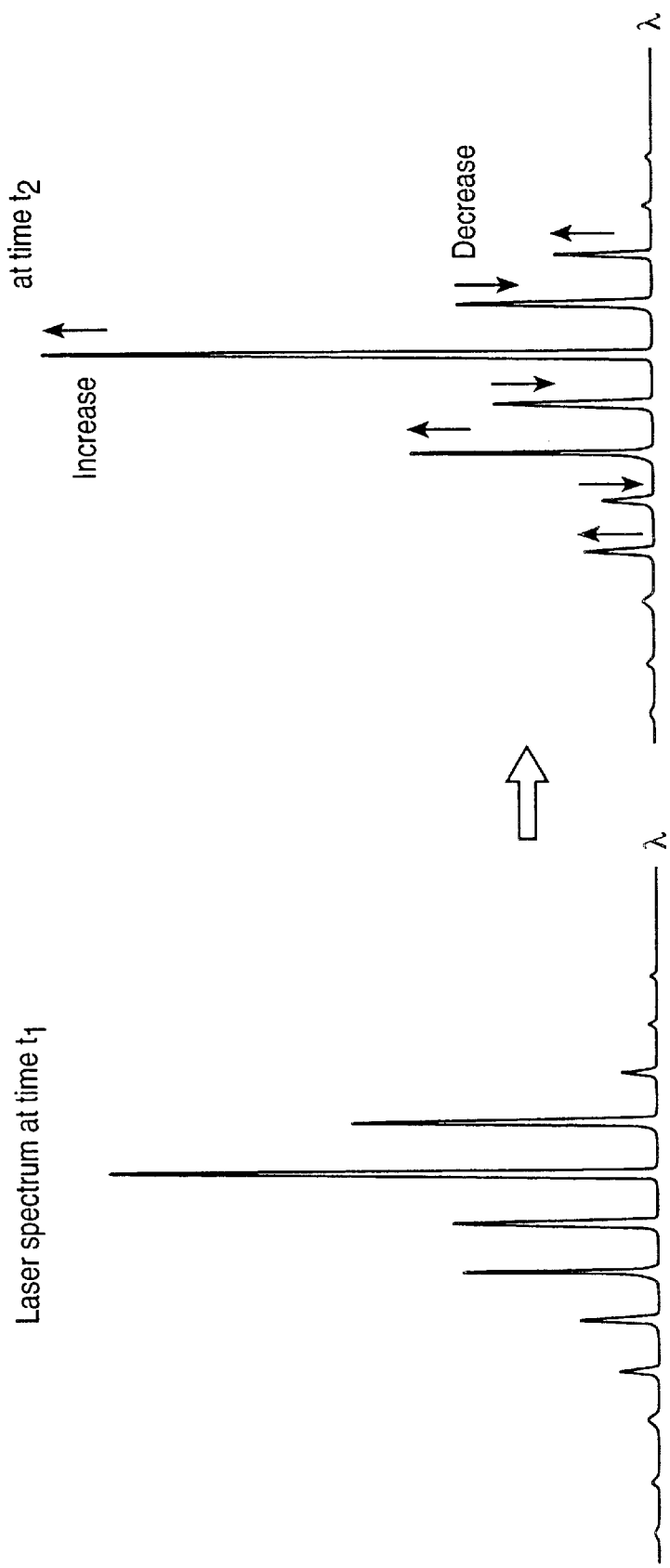
FIG. 2 illustrates a mode partitioning of the output power of a multimode laser of a preferred embodiment of the present invention.

As illustrated in FIG. 2, the multimode laser 110, which in a preferred embodiment is a Fabry-Perot (FP) laser diode, generates multiple pulsed longitudinal modes (main light signal), which carry the magneto-optical (MO) signal from the MO medium 190 to the differential detection module 116, at a certain pulse frequency (e.g., typically 300–500 MHz). The LBS 120, which is coupled to the multimode laser 110, receives the main outgoing p-polarized light beam from the laser 110 and transmits most of this p-polarized light (e.g., approximately 80%) of the main light signal along a forward path toward the PDL 160 and the MO medium 190.

In a preferred embodiment, the HWP1 130, which is coupled between the LBS 120 and a first end of the PDL 160, rotates the main light polarization by approximately 45 degrees to ensure that upon entering the PDL 160 on the forward path, the main light signal will split into two relatively equal component signals with the first component signal maintained as a p-polarized light (p-wave) signal and the second component signal transformed as an s-polarized light (s-wave) signal. For illustrative purposes only, the p-wave will be presumed to propagate through a first polarizing beam splitter PBS1 169 along a short delay path length $L_p$ of the PDL 160 and the s-wave signal is presumed to be redirected by the PBS1 169 to propagate along a long delay path length $L_s$ of the PDL 160. The p- and s-waves are then recombined and made co-propagating by a second polarizing beam splitter PBS2 170. The differing delay path lengths result in a forward path difference $\Delta d_{forward\ (PDL)}$ of $(L_s - L_p)$, which corresponds to a delay time $\tau_{forward(PDL)}$ between the s-wave signal and the p-wave signal of:

$$(\Delta d_{forward\ (PDL)})/c = (L_s - L_p)/c,$$

where c is the value for the speed of light in a vacuum.

Figure 3:
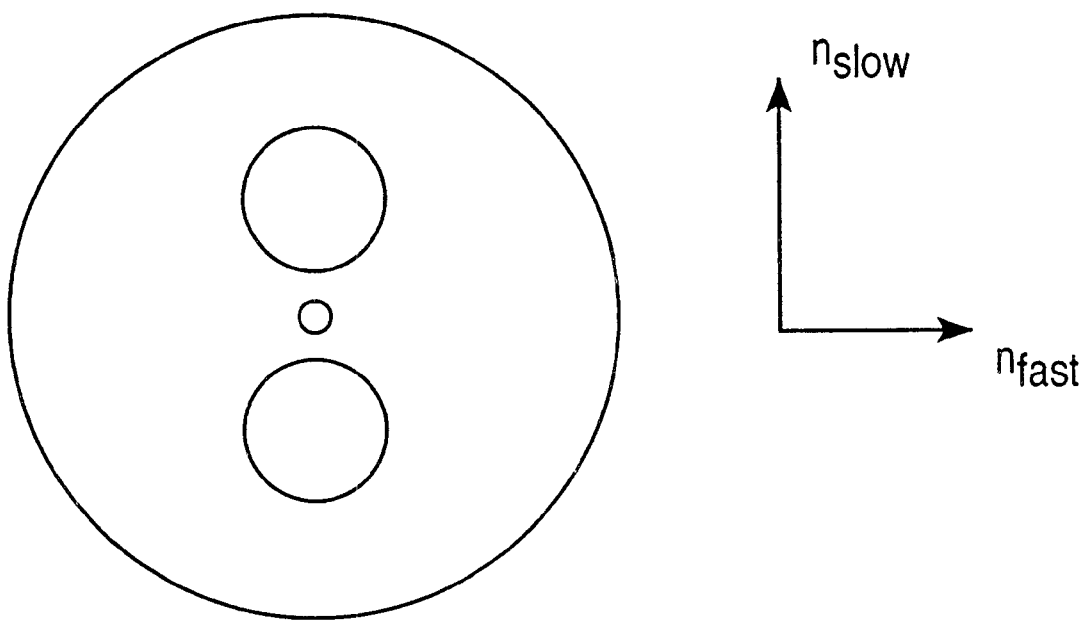
FIG. 3 illustrates a polarization-maintaining fiber of a preferred embodiment of the present invention.

The HWP2 177, which is coupled between a second end of the PDL 160 and a first end of the PM fiber 180, aligns the p-wave signal and the s-wave signal, which exit the PDL 160, with the birefringent ($\Delta n_B = n_{slow} - n_{fast}$) axes of the PM fiber 180 which are illustrated in FIG. 3. In particular, the HWP2 177 aligns the s-wave signal to propagate along the slow axis $n_{slow}$ of the PM fiber 180 and the p-wave signal to propagate along the fast axis $n_{fast}$ of the PM fiber 180. In a preferred embodiment, the birefringence $\Delta n_B$ is typically in the range from $10^{-4}$ to $10^{-3}$. In alternative embodiments the s-wave and p-wave signals are aligned to propagate along the opposite fiber axes.

Figure 4:
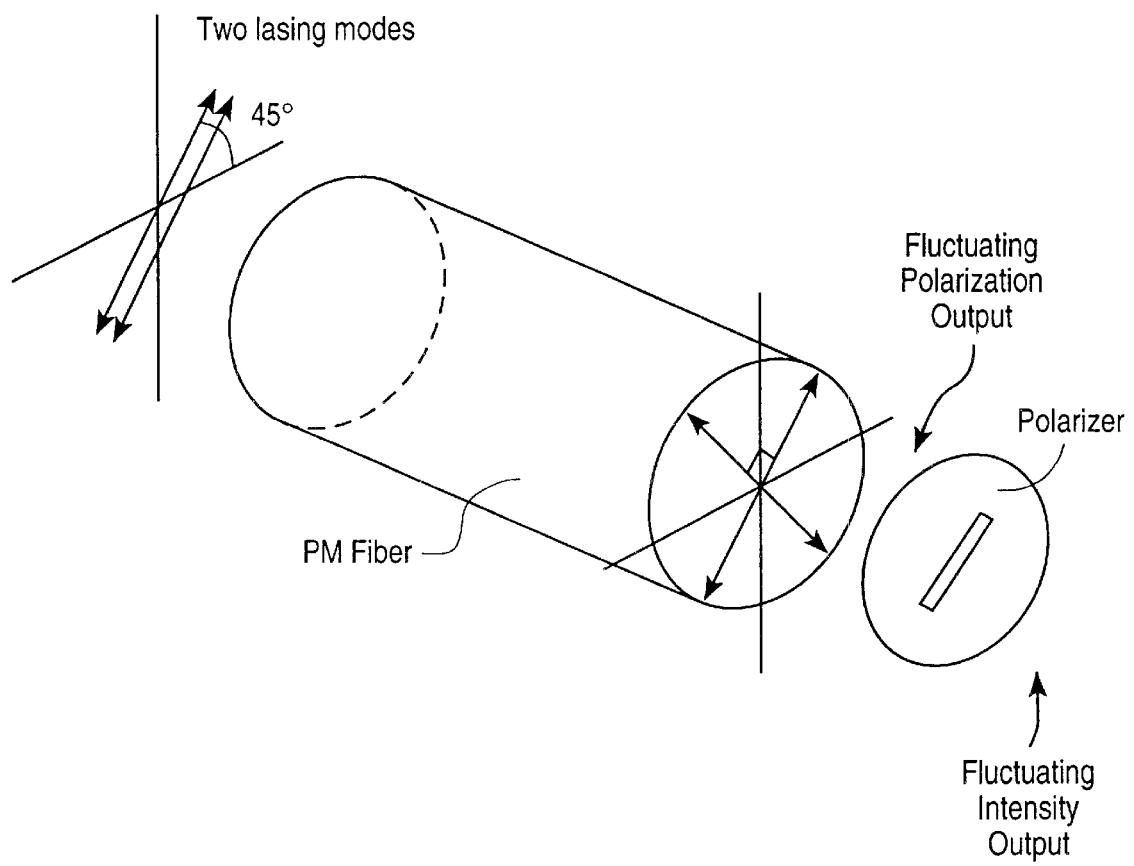
FIG. 4 illustrates multi-longitudinal laser light (in this case two modes for simplicity) producing mode partition noise when the laser light propagates through a birefringent medium such as a PM fiber in a preferred embodiment of the present invention.
Figure 5:
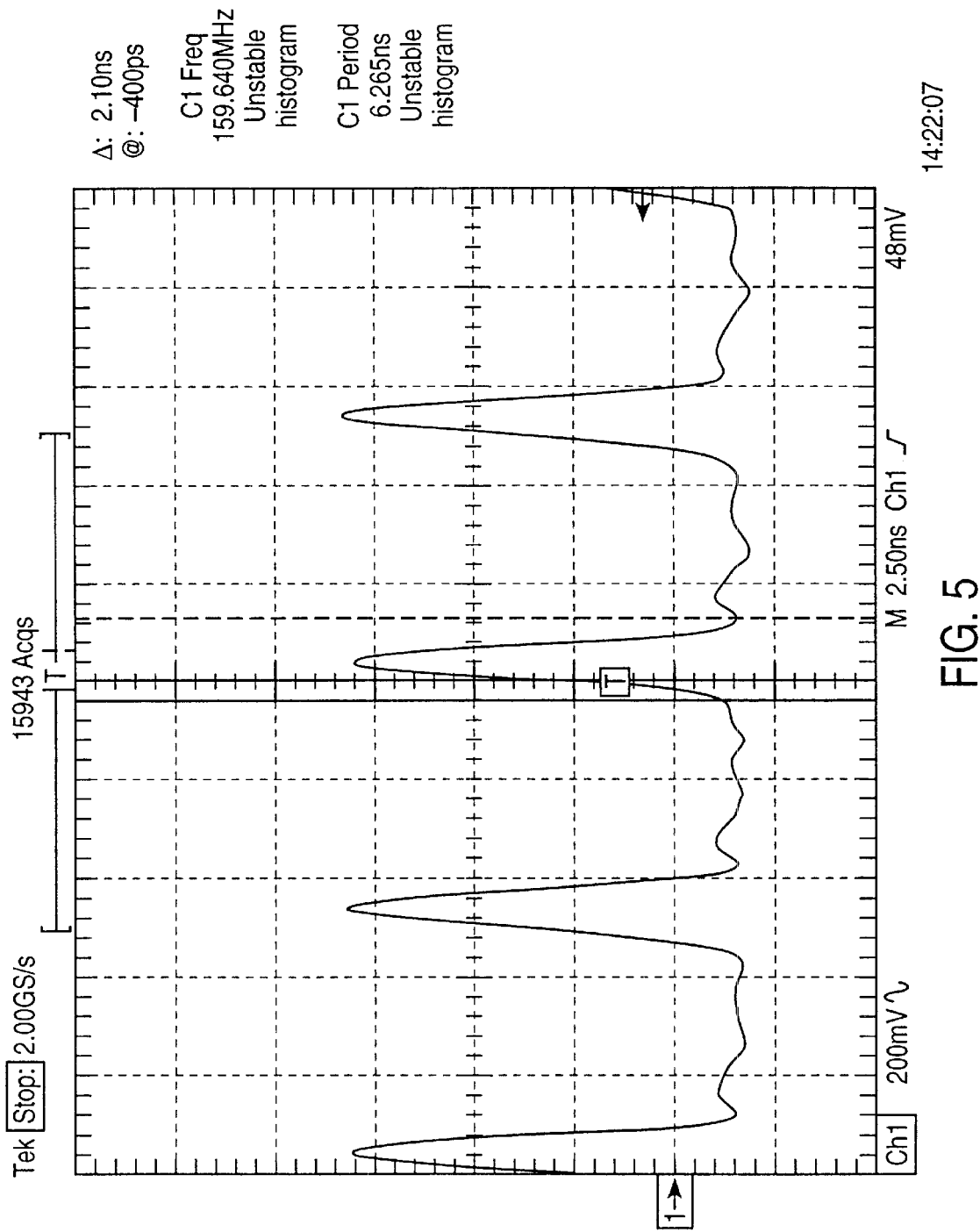
FIG. 5 illustrates the optical signal arriving at the detection module in the case of a well aligned quarter wave plate (QWP1) in a preferred embodiment of the present invention.

FIG. 4 illustrates, for a 2-mode laser, the manner in which mode partition noise (MPN) can arise in a preferred embodiment of the present invention. In particular, the figure illustrates two linearly polarized modes launched at 45 degrees into the PM fiber 180. Each of the two modes splits into fast and slow polarization components inside the fiber 180. Upon exiting the fiber each of the two longitudinal modes assumes a random polarization state that depends on the relative phase shift between the fast and slow polarization components. Because the two longitudinal modes are dynamically competing with one another for power as discussed with regard to FIG. 2, the net polarization state at the output of the fiber 180 fluctuates in time, producing polarization noise (e.g., mode partition noise). Upon passing through a polarizer, this polarization noise is converted into intensity noise.

Since the slow axis of the PM fiber 180 has a refractive index, which is larger than the refractive index of the fast axis, the s-wave signal will propagate along the slow axis at a slower phase velocity. In addition, the slower phase velocity also corresponds to an optical path length $F_s$, which is longer than the optical path length $F_p$ of the fast axis. The relative optical path difference $\Delta d_{forward\ fiber}$ between the slow axis and the fast axis can be expressed as $(F_s-F_p)$, which corresponds to a relative time delay, $\tau_{fiber\ (forward)}$, of $(L_{fiber}\Delta n_B)/c$ (where $L_{fiber}$ is the physical length of the PM fiber 180, $\Delta n_B$ is the birefringence of the PM fiber 180 and c is the speed of light in a vacuum) between the p-wave and s-wave signals. This time delay, $\tau_{fiber(forward)}$, plus that of the PDL, $\tau_{PDL\ (forward)}$, corresponds to a net forward path phase difference of $\phi_k=\omega_k\ (\tau_{forward\ (PDL)}+\tau_{forward\ (fiber)})$ (where $$\omega_k = \frac{2\pi c}{\lambda_k}$$

and $\lambda_k$=wavelength of $k^{th}$ laser mode) for the $k^{th}$ laser mode, which in turn determines the polarization for the $k^{th}$ laser mode at the fiber output. With each mode of the laser generally having a different polarization when exiting the second end of the PM fiber 180 in conjunction with the intensities of each mode fluctuating, the total PM fiber output polarization fluctuates at the second end of the PM fiber 180, resulting in significant MPN.

Elimination of MPN and any accompanying laser phase noise can be achieved by reducing the optical path difference between the two polarization components of the main light signal to zero. In a preferred embodiment, such a reduction of the optical path difference is achieved by double passing the QWP1 185, thereby reorienting the polarization by 90 degrees for the return path through the PM fiber 180 and PDL 160. In particular, the QWP1 185 is aligned at 45° with respect to the fiber axes at the second end of PM fiber 180 so that the QWP1 185 converts the two linearly polarized components, the s-wave signal and the p-wave signal, into left and right circularly polarized states. Upon reflection from the MO medium 190, the sense of the two circular states is reversed (e.g., right polarization becomes left polarization and left polarization becomes right polarization). After passing through QWP1 on the return path, the circular states are converted back to corresponding linear states with a 90° rotation.

Upon entering the second end of PM fiber 180 on the return path, the 90 degree polarization rotation of the main light signal results in a compensation of the optical path. For example, the first component of the main light signal, which originally propagated as a p-wave signal on the forward path along the short delay path length $L_p$ of the PDL 160 and along the fast axis $F_p$ of the PM fiber 180, now propagates on the return path as an s-wave signal along the slow axis $F_s$ of the PM fiber 180 and the long delay path length $L_s$ of the PDL 160. The original s-wave signal, which is now a p-wave signal, propagates on the return path along the fast axis $F_p$ of the PM fiber 180 and the short delay path length $L_p$ of the PDL 160. By having each component of the main light signal propagate down one delay path length of the PDL 160 and one axis of the PM fiber 180 on the forward path and the opposite delay path length and fiber axis on the return path, the recombined main light signal, which exits the first end of the PDL 160, does not experience a net optical path difference like the main light signal exiting the second end of the PM fiber 180. This lack of a significant net optical path difference in the main light signal results in the minimization of the relative delay time between the two components of the main light signal, thereby avoiding the development of SPN. In particular, at the end of the round trip propagation through both the PDL 160 and the PM fiber 180, the first component and the second component of the main light signal will have propagated the equal combined length of Lp+Fp+Fs+Ls and Ls+Fs+Fp+Lp, respectively.

Figure 8A:
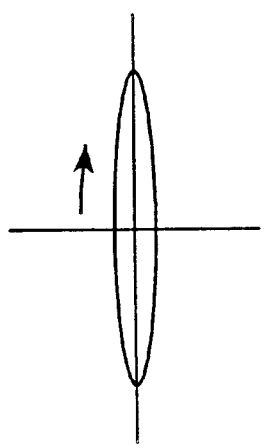
FIGS. 8(a) and 8(b) illustrate the polarization states of the main light signal in the detection path before and after QWP2, respectively, with and without a logic state of a preferred embodiment of the present invention.
Figure 8A:
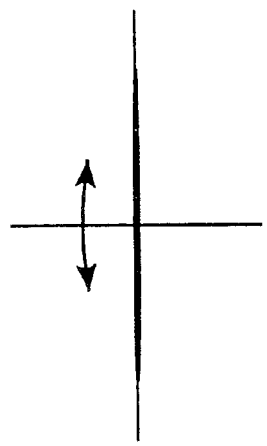
Figure 8A:
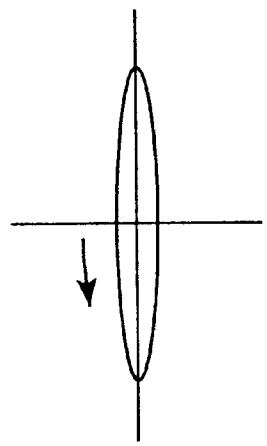
Figure 8B:
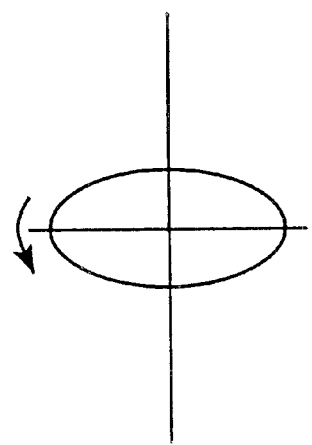
Figure 8B:
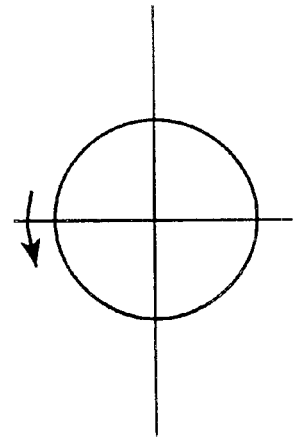
Figure 8B:
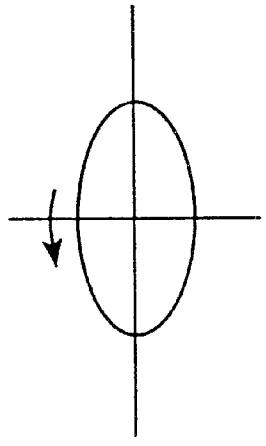

FIGS. 8(a) and (b) illustrate the nature of the return polarization state of the main light signal upon round-trip propagation through the system 100. In FIG. 8(a) with the absence of a Kerr effect, the polarization state reflecting off of the LBS 120 is identical to the input state, namely the p-wave signal. In FIG. 8(b) after the p-wave signal passes through the QWP2 114, which is oriented at 45 degrees, this p-wave signal is converted into a circular polarized state which, due to the balance of this signal, produces a zero output signal in the differential detector 116.

In the presence of a Kerr effect, FIG. 8(a) illustrates that a small s-wave is produced that is either positive or negative 90 degrees out of phase with the p-wave depending on the sign (e.g., up or down) of the magnetism being probed at the MO disk 190. After LBS 120, FIG. 8(a) illustrates that with the Kerr effect the main light signal has a slight elliptical polarization with either a right-hand (magnetism down) or left-hand (magnetism up) sense of rotation. After passing through QWP2 114, FIG. 8(b) illustrates that these two states can be distinguished from one another by the differential detection 116 because the Kerr and non-Kerr light are brought back in phase and interfere to produce distinguishable difference signals.

Even though the system 100 theoretically can eliminate the relative time delay of the two components of the main light signal by just providing a net optical path difference of zero, unavoidable misalignment errors within the system 100 cause a parasitic light signal to be present which in turn affects the noise level of the detected signal. In particular, errors typically arise in individual optical components or in their respective alignment to one another. In a preferred embodiment, one component of particular interest is QWP1 185, which can reside on an optical recording head. Errors in both the retardation and alignment of QWP1 185 are typically difficult to control due to the small physical size of this component (e.g., 0.090×0.20×1.0 mm³).

The parasitic light signal is that portion of the light that propagates through the optical system and reaches the differential detection module with the two principal polarization components having experienced a non-zero optical path difference. In particular, each error in the thickness or the rotational alignment of the QWP1 185 will produce parasitic light, which can in turn causes large first-order SPN (e.g., SPN due to one component error). In addition, second-order MPN (e.g., SPN due to a combination of two component errors) also may develop if the PDL 160 and the PM fiber 180 are misaligned in combination with an error in QWP1. In a preferred embodiment, the misalignment between the PM fiber 180 and the PDL 160 is avoided by grouping all of the PM fibers 180 into an array such that all of the axes of the PM fibers 180 are well aligned (e.g., with less than 1 degree of error) with respect to one another. An alternative embodiment for avoiding misalignment between the PM fibers 180 and the PDL 160 is to utilize a dynamic electrically controlled polarization rotator (e.g., by placing HWP2 177 on an electrically controlled rotation stage or by replacing HWP2 177 with a nematic liquid crystal cell used in combination with a quarter-wave plate) that can be used between the PDL 160 and the first end of the PM fiber 180 to provide active alignment for switching between PM fibers 180.

The parasitic light signal, which is generated by a retardation or orientation error in QWP1 185, propagates on the return path along the same axis and path length as originally propagated along in the forward path. By failing to travel on the opposite axis and delay path length, the s- and p-components of the parasitic light signal experience a significant optical path length difference of $2(L_s+F_s)-2(L_p+F_p)$ upon reaching the differential detection module, which in turn may produce SPN that degrades the system signal-to-noise ratio. In particular, the parasitic light signal on one axis will be time delayed and the parasitic light signal on the opposite axis will be time advanced relative to the main signal wave components (which both travel the same optical path). Generally speaking (e.g., when the laser is operated in a continuous wave fashion or under some arbitrary modulation condition), the parasitic waves will, in the detection system, overlap in time with one another and with the main light signal. As a result, these superimposed parasitic light signals and main light signal will interfere with each other. This interference can result in large amounts of SPN, causing the differential detection module 116 to have difficulty detecting the Kerr effect within the main light signal. Only if the laser diode is modulated in an on-off fashion at a proper frequency can the effects of SPN be overcome. When utilizing proper modulation, as disclosed herein, the parasitic light signal and the main light signal do not overlap in time, thereby eliminating the interference between the parasitic light signals and the main light signal, which in turn precludes the formation of SPN. More specifically, the PDL 160 creates a path length difference, which is sufficiently large when compared to those contributed only by a short piece of PM fiber 180, to allow a reasonable modulation frequency to be able to be used to produce the necessary time separation.

With proper laser modulation (the details being subsequently provided), the PDL 160 eliminates first-order SPN due to a component error in QWP1 by time shifting the parasitic light signals substantially away from each other and from the main light signal. In particular, the PDL 160 utilizes a physical one-way delay path length difference $(L_p-L_s)$ of approximately 0.2–0.5 meter. With such a small physical delay length, the PDL 160 is easy and inexpensive to implement. In addition, the PDL 160 minimizes the amount of both mode partition noise and laser phase noise present in the system 100 to enable the effects of laser noise to be minimized to approximately the shot-noise-limited performance level.

In a preferred embodiment, the PDL 160 comprises a first polarization beam splitter (PBS1) 169, a second polarization beam splitter (PBS2) 170, a first mirror 165 and a second mirror 175. Prior to the main light signal entering the PDL 160 on the forward path, the HWP1 130 orients the light signal by 45 degrees to ensure that the PBS1 169, which is coupled to the HWP1 130, receives and splits the main light signal into two equal-amplitude components with the transmitted component, a p-wave signal, and the reflected component, an s-wave signal. The PDL 160 then allows the s-wave signal to propagate along the optical path length $L_s$ by redirecting the s-wave signal to reflect off of both the first mirror 165 and the second mirror 175. The p-wave signal propagates along the delay path length $L_p$ by direct transmission through PBS1 169 and PBS2 170. The PBS2 170 receives both the s- and p-wave signals and recombines them back into the main light signal. The PBS2 170 receives both the s- and p-waves and directs both of them through the HWP2 177 (or an equivalent polarization rotator) into one of the set of PM fibers 180, which effectively acts as an extension of the PDL 160. The alignment between the PDL 160 and the PM fiber 180 by the HWP2 177 results in the s- and p-waves leaving the PDL 160 and entering onto the fast and slow fiber axes of the PM fiber 180, respectively (or vice versa). The resulting optical path difference Δd between the p-wave signal and the s-wave signal components in the forward path is therefore:

$$\Delta d=(L_s+F_s)-(L_p+F_p)=(L_s-L_p)+\Delta nL_{fiber},$$

where Δn is the fiber birefringence and $L_{fiber}$ is the PM fiber length. In a preferred embodiment, with $L_p$=10 cm, $L_s$=50 cm, Δn=$10^{-3}$, and $L_{fiber}$=100 cm, the forward path difference Δd would equal 40.1 cm.

In an alternative embodiment, the HWP2 177 can be eliminated if the axes of the PDL 160 are mechanically aligned with sufficient precision (e.g., less than one degree) with the axes of each PM fiber 180. In an additional alternative embodiment, this system 100 also could be constructed from one long piece of PM fiber 180, but the corresponding length would be approximately 401 meters. The PDL 160 of a preferred embodiment, however, offers a more compact and less expensive implementation.

The main light, after leaving the PM fiber 180 in the forward path, passes through QWP1 185, reflects off of the MO disk 190 and once again goes through QWP1 185. Double passing QWP1 185 converts the outgoing s-wave signal into a p-wave signal on the return trip and the outgoing p-wave signal into an s-wave signal. To the extent that QWP1 185 has errors in either its retardation (e.g., its phase shift departs from 90 degrees) or its 45 degree orientation, parasitic waves will exist. These parasitic waves correspond to that portion of the outgoing light that is not properly converted by QWP1 185, namely outgoing s-waves that return as s-waves and outgoing p-waves that return as p-waves. Each polarization component of the main light signal, therefore, propagates along both delay path lengths of the PDL 160 while each component of the parasitic light signal only travels along one of the two optical paths lengths. In this way the two polarization components of the parasitic light signal will experience a round-trip time shift relative to the main light signal and themselves.

Figure 6:
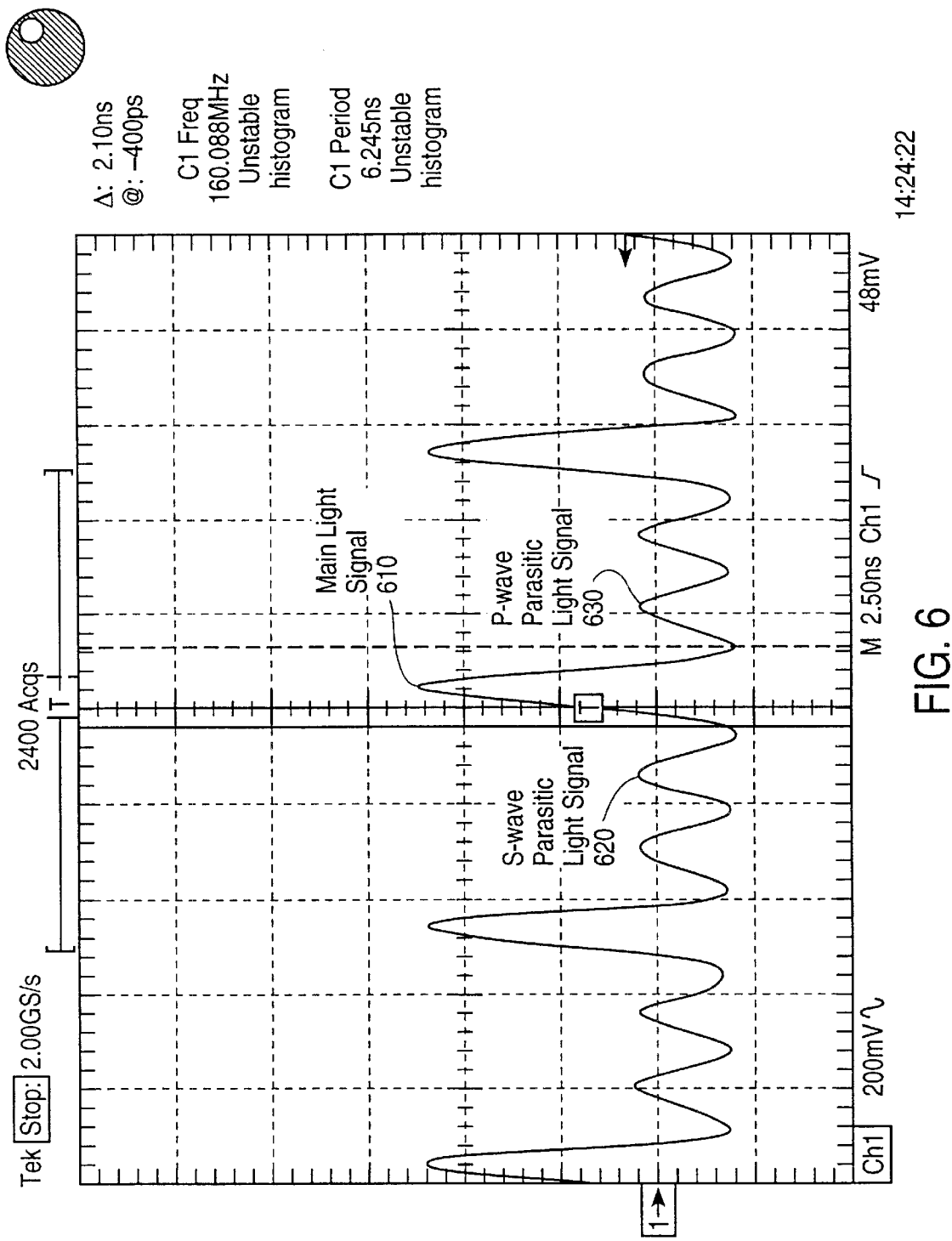
FIG. 6 illustrates a parasitic light signal (arising from misalignment of QWP1) time shifted away from the main light signal of a preferred embodiment of the present invention.

For example, as illustrated in FIG. 6, upon exiting the first end of the PDL 160 on the return path, both the s- and p-wave components of the main light signal 610 have propagated a total optical length of $L_p+F_p+F_s+L_s$. Since the parasitic light signal propagates along the same fiber length and delay path length on both the forward and return paths, a p-wave parasitic light signal 630 would propagate a shorter net optical length of $2F_p+2L_p$ and an s-wave parasitic light signal 620 would propagate the longer net optical length of $2F_s+2L_s$. This difference in the net optical length between the two components of the parasitic light signal and the main light signal results in the p-wave parasitic light signal 630 being time shifted ahead of the main light signal and the s-wave parasitic light signal 620 time shifted behind the main light signal.

To ensure approximately complete time-separation of both the s-wave and p-wave parasitic light signals from the main light signal, the multimode laser 110 is pulsed on and off at a duty factor of approximately 33%. Such a duty factor ensures that each of the three time separated pulses (e.g., the s-wave and p-wave signals of the parasitic signal and the main light signal), which are of the same temporal width, each will separately monopolize approximately ⅓ of the laser pulse period. Failure to utilize such a duty factor causes the components of the parasitic light signal to overlap with other light signals. For example, in a continuous wave laser environment, the parasitic light signal components would temporally overlap (e.g., overlap in time) with each other as well as with the main light signal, thereby generating SPN effects in the detection channel.

With the forward path difference ($\Delta d_{forward(PDL)}$) in the PDL 160 in a preferred embodiment set in a manner that ensures that the one-way delay time ($\tau_{forward(PDL)} = \Delta d_{forward(PDL)}/c$) is approximately one-third of the laser modulation period ($T_{laser}$), the path difference $\Delta d_{forward(PDL)}$ of the two path lengths is $c(T_{laser})/3$. By pulsing the multimode laser 110 on and off in a preferred embodiment at a high frequency (e.g., approximately 100–1000 MHz) and designing the PDL 160 to have such an appropriate frequency-dependent delay path difference $$\Delta d_{forward(PDL)} = cT_{laser}/3 \ \Delta d_{forward(PDL)} = \frac{cT_{laser}}{3}$$

Figure 7:
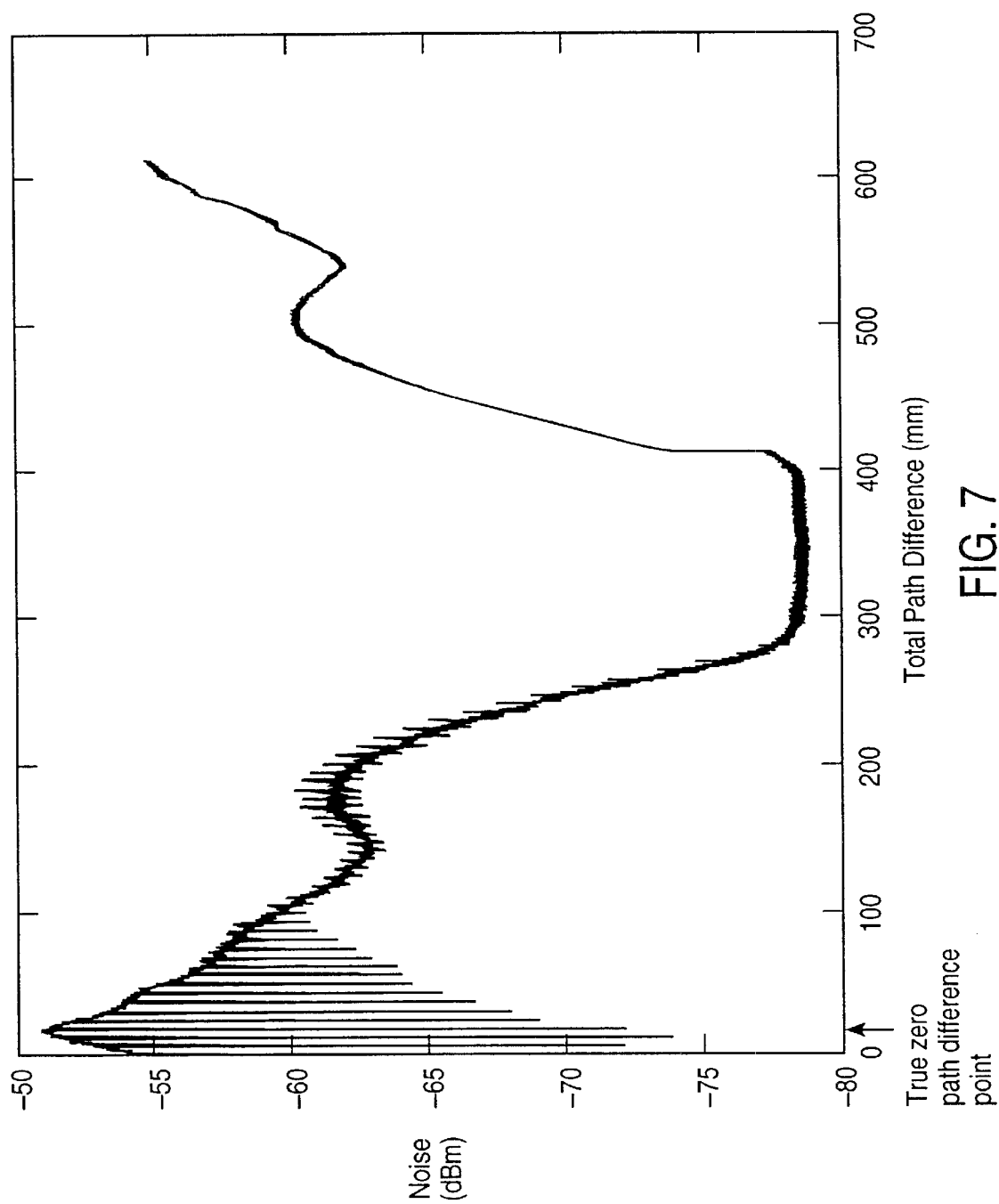
FIG. 7 illustrates a plot of multimode diode laser noise (SPN comprising both mode partition noise and phase noise) versus the path difference between two beams in a free-space interferometer.

(e.g., 10–70 cm), the PDL 160 effectively minimizes the effects of the parasitic light signal in the system 100, thereby minimizing the SPN that otherwise corrupts the main light signal. For example, as illustrated in FIG. 7, when the laser modulation frequency of an illustrative embodiment is 450 MHz, a path difference $\Delta d_{forward(PDL)}$ of approximately 30 cm is required. More specifically, for small path differences (e.g., less than about 0.1 m), the noise is dominated by mode partition effects and therefore shows significant structure with noise minima occurring at coherence peaks. The lowest noise region of the illustrative embodiment as illustrated in FIG. 7 occurs at a path difference of approximately 0.33 m, at which point the two light signals exiting the interferometer do not overlap in time. As the path difference increases beyond 0.33 m, the noise again increases and is dominated by laser phase noise effects. Such an illustrative example demonstrates the principle utilized in various embodiments of the present invention.

Figure 9:
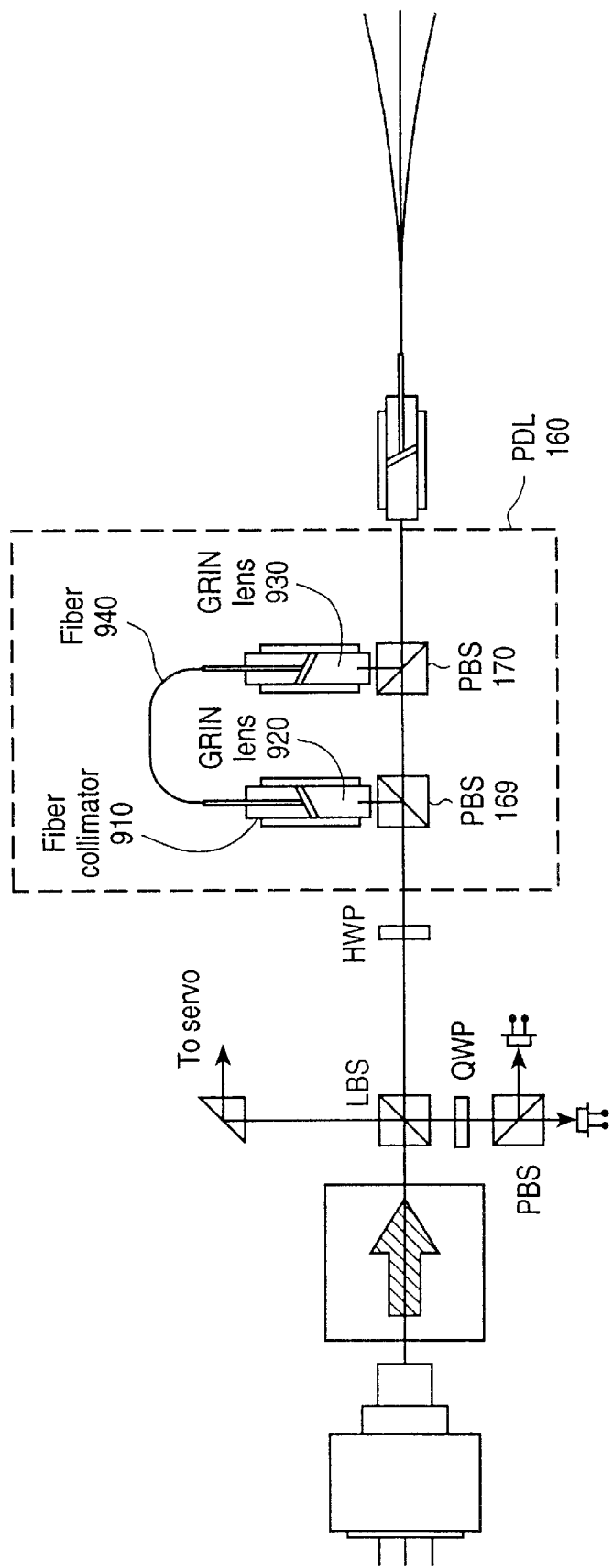
FIG. 9 illustrates a polarimetric delay line with a fiber collimator of an alternative embodiment of the present invention.

Even though a preferred embodiment focuses upon a free-space version of PDL 160 having propagation paths with a refractive index approximately equal to air (i.e., n=1), alternative embodiments of the present invention achieve the same necessary frequency-dependent optical path differences by utilizing guided-wave propagation paths with refractive indices greater than 1. For example, FIG. 9 illustrates a first alternative embodiment of the PDL 160 comprising the PBS1 169, the PBS2 170 and a fiber collimator 910. The fiber collimator 910 enables the system 100 to be more compact and manufacturable. In particular, the fiber collimator 910 comprises a first GRIN lens 920 (e.g., with a 0.25 pitch), a second GRIN lens 930 (e.g., with a 0.25 pitch) and a fiber 940, which has a refractive index of approximately 1.5. The fiber collimator 910 accepts and outputs a collimated free-space beam of the appropriate diameter. The fiber 940 in this embodiment of the PDL 160 can be a polarizing fiber (e.g., PZ fiber), PM fiber, or a suitably routed low-birefringence (Lo-Bi) fiber. The primary constraint for an alternative embodiment is that the fiber 940 must propagate a single linear polarization state (e.g., s-wave signal) with a high extinction ratio.

Figure 10:
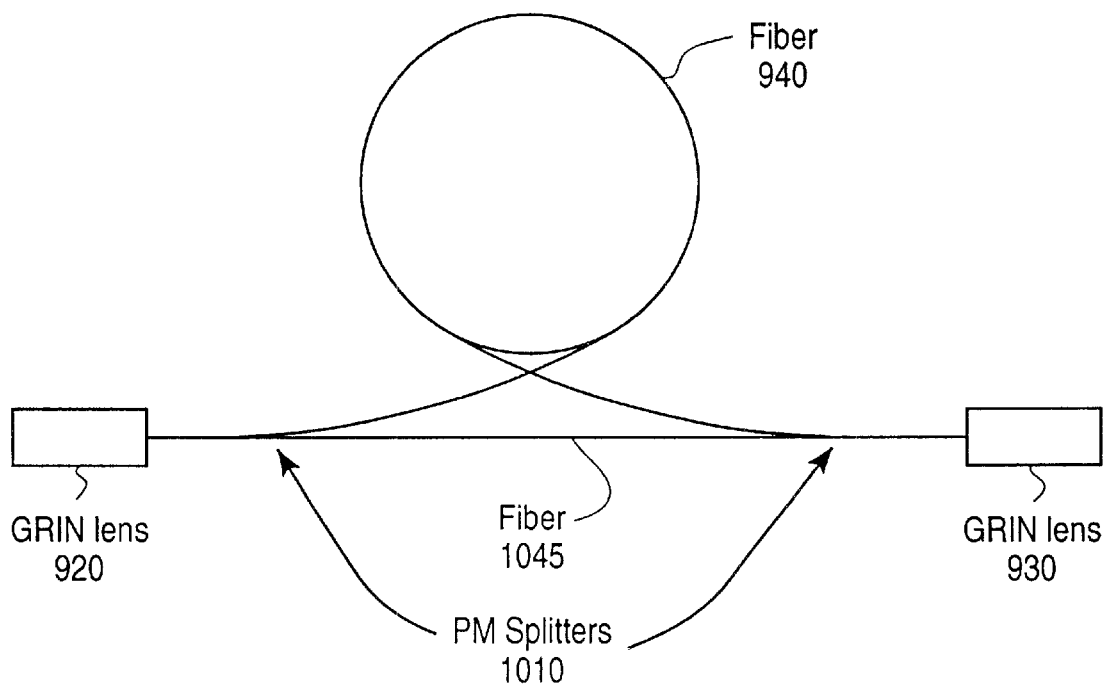
FIG. 10 illustrates an all-fiber version of the polarimetric delay line of an alternative embodiment of the present invention.

FIG. 10 illustrates a second alternative embodiment of the system 100 with an all-fiber version of the PDL 160. In particular, this PDL 160 comprises polarization beam splitters 1010 within the fiber 1045. The long path length $L_s$ is provided by fiber 940 while the small path length $L_p$ of the PDL 160 is provided by fiber 1045. To make the device compatible with collimated free-space operation, the first GRIN lens 920 (e.g., with a 0.25 pitch) and the second GRIN lens 930 (e.g., with a 0.25 pitch), respectively, are placed at the input and the output of the fiber 940. The all-fiber PDL approach depicted in FIG. 10 eases difficulty of alignment of the components compared to the free-space version of FIG. 1 and the hybrid approach of FIG. 9; however, the all-fiber version requires high-performance PM splitters 1010. Furthermore, to avoid reflections from the end surfaces of the fiber 940, which could increase the SPN in the system 100, the ends of the fiber 940 are angle-cleaved and carefully aligned with the GRIN lenses 920 and 930 that have been similarly angle polished. When compared to straight-cleaved fibers 940, angle-cleaved fibers 940 generally result in the forward coupling efficiency for the system 100 to be as high as 70–80%. End face reflections from straight-cleaved fiber 940 also can be eliminated by using index-matching epoxy between the GRIN lenses 920 and 930 and the fiber ends.

The foregoing description of the preferred embodiments has been presented for purposes of illustration and description. It is not intended to be exhaustive nor to limit the invention to the precise form disclosed. Many modifications and variations are possible in light of the above teaching. Preferred embodiments were chosen and described to best explain the principles of the present invention and its practical application to thereby enable others skilled in the art to best utilize the invention in various embodiments and with various modifications as are suited to the particular use contemplated. It is intended that the scope of the invention be defined by the claims and their equivalents.

What is claimed is:

1. A low noise optical system coupled to a laser generating a main light signal, the system comprising:

means for pulsing the laser on and off with a laser modulation period determined by at least one of the optical lengths associated with the first and second conduits;

a first beam splitter adapted to receive the main light signal from the laser and adapted to transmit a first component signal and a second component signal, the first component signal including a first portion of the main light signal and the second component including a second portion of the main light signal;

a first conduit having a first optical length, a first end and a second end, coupled at the first end of the first conduit to the first beam splitter, adapted to propagate on the forward path the first component signal and on the return path a third component signal, said third component signal including the second portion of the main light signal and a first parasitic light signal; and a second conduit having a second optical length, a first end and a second end, coupled at the first end of the second conduit to the first beam splitter, adapted to propagate on the forward path the second component signal and on the return path a fourth component signal, the fourth component signal including the first option of the main light signal and a second parasitic light signal, the second optical length having a longer optical length than the first optical length adapted to cause, upon combination of the third component signal with the fourth component signal, a time separation between the main light signal and the first parasitic light signal and the second parasitic light signal.

2. The system of claim 1 further comprising a second beam splitter, coupled to the second end of the first conduit and the second end of the second conduit, adapted to receive the first component signal and the second component signal and adapted to transmit the main light signal with a time delay between the first component signal and the second component signal.

3. The system of claim 1 wherein the first conduit and the second conduit include free-space propagation in a refractive index approximately equal to the refractive index of air.

4. The system of claim 1 wherein the second conduit includes a fiber collimator.

5. The system of claim 1 wherein the first conduit and the second conduit each include a polarization maintaining optical fiber.

6. The system of claim 1 wherein a physical length difference between the second optical length and the first optical length is less than 1 meter.

7. The system of claim 1 wherein the physical length difference between the first optical length and the second optical length is approximately equal to $(cT_{laser})/3$, where c is the speed of light in air and $T_{laser}$ is a modulation period for the laser.

8. The system of claim 7 wherein the laser modulation period has a duty cycle of at least ⅓.

9. The system of claim 1 wherein the first beam splitter and the second beam splitter each include a polarization beam splitter.

10. The system of claim 1 wherein the first beam splitter and the second beam splitter each include a polarization fiber splitter.

11. The system of claim 10 further comprising a first GRIN lens, coupled to the first polarization splitting fiber, adapted to direct the propagation along the forward path of the main light signal through the polarization splitting fiber.

12. The system of claim 1 further comprising a quarter wave plate, coupled to the second beam splitter, adapted to reorient the main light signal to enable the second beam splitter on a return path to split the main light signal into the third component signal and the fourth component signal.

13. The system of claim 1 further comprising a reflective media, coupled to the second beam splitter, adapted to redirect the main light signal from the forward path to the return path.

14. The system of claim 13 wherein said reflective media includes a magneto-optical media adapted to transfer logic state information stored magnetically on the magneto-optical media to the main light signal by relying upon the Kerr effect.

15. The system of claim 1 further comprising a third conduit having a first end, a second end, a third optical length and a fourth optical length, said first end of said third conduit coupled to said second end of said first conduit and said second end of said second conduit, adapted to propagate the main light signal, the first parasitic signal and the second parasitic light signal.

16. The system of claim 15 wherein said third conduit includes an optical fiber.

17. The system of claim 16 wherein the optical fiber includes a polarization maintaining optical fiber with the fourth optical length representing a fast axis of the polarization maintaining fiber and the third optical length representing a slow axis of the polarization maintaining fiber.

18. The system of claim 1 further comprising a first half wave plate, coupled to the first beam splitter, adapted to orient the polarization of the main light signal propagating on the forward path to cause the first beam splitter to split the main light signal into the first component signal and the second component signal.

19. The system of claim 15 further comprising a first half wave plate, disposed between the second beam splitter and the third conduit, adapted to orient the main light signal on the forward path to enable the third conduit to split the main light signal into the third component and the fourth component.

20. The system of claim 1 further comprising a leaky beam splitter, coupled to the first beam splitter, adapted to receive the main light signal from the laser and adapted to transmit the main light signal with a polarization state to the first beam splitter.

21. The system of claim 14 further comprising a differential detection module, coupled to the first beam splitter, adapted to detect the logic state information contained within the main light signal.

22. The system of claim 1 further comprising a quarter wave plate, coupled to the first beam splitter, adapted to approximately circularly polarize the main light signal propagating on the return path.

23. An optical system, coupled to a laser, adapted to minimize the effects of spectral polarization noise on a main light signal, the system comprising:
  means for pulsing the laser on and off;
  a reflective magneto-optical media adapted to transfer logic state information stored magnetically on the media to the main light signal by relying upon the Kerr effect;
  a polarization maintaining optical fiber, coupled to the reflective magneto-optical media, adapted to propagate the main light signal to and from the reflective magneto-optical media, wherein the polarization maintaining optical fiber includes a first axis and a second axis having different transmission speeds; and
  a polarimetric delay line, coupled to the polarization maintaining optical fiber, adapted to propagate the main light signal to and from the reflective magento-optical media, wherein the polarimetric delay line includes a first delay path and a second delay path having different path lengths and wherein a first component signal of the main light signal propagates along the first delay path and the first axis and a second component signal of the main light signal propagates along the second delay path and the second axis when the main light signal is transmitted towards the reflective magneto-optical media, and when the main light signal is transmitted away from the reflective magneto-optical media the first component signal propagates along the second delay path and the second axis and the second component signal propagates along the first delay path and the first axis, wherein at least one parasitic light signal is time separated from the main light signal.

24. A method for reducing the effects of spectral polarization noise, the method comprising the steps of:
  splitting a main light signal received from a laser into first component signal and a second component signal;
  propagating the first component signal on the forward path through a first conduit;
  propagating the second component signal on the forward path through a second conduit, wherein the second conduit includes a longer optical length than the first conduit;
  transforming the first component signal into a fourth component signal, said fourth component signal including the first component signal and a first parasitic light signal; transforming the second component signal into a third component signal, said component signal including the second component signal and a second light signal;
  propagating the fourth component signal on the return path through the second conduit;
  propagating the third component signal on the return path through the first conduit;

pulsing the laser on and off with modulation period determined by at least one optical path length associated with the first and second conduits; and combining the third component signal with the fourth component signal to reform the main light signal, wherein the modulation period and the optical path lengths associated with the first and second conduits time separate the first parasitic light signal and the second parasitic light signal from the main light signal.

25. The method of claim 24 further comprising the step of redirecting the main light signal from the forward path to the return path.

26. The method of claim 25 further comprising the step of transferring logic state information stored magnetically on a magneto-optical media to the main light signal by relying upon the Kerr effect.

27. The method of claim 24 further comprising the step of propagating on the forward path the first component signal and the second component signal through a polarization maintaining optical fiber and propagating on the return path the third component signal and the fourth component signal through the polarization maintaining fiber.

28. The method of claim 24 further comprising the step of orienting the main light signal propagating on the forward path to cause a first beam splitter to split the main light signal into the first component signal and the second component signal.

29. The method of claim 23 further comprising the step of detecting the logic state transported within the main light signal.

30. A method for reducing the effects of spectral polarization noise, the method comprising the steps of:

splitting a main light signal received from a laser into a first component signal and a second component signal;

propagating the first component signal through a first conduit having a first optical path length;

propagating the second component signal through a second conduit having a second optical path length different from the first optical path length;

redirecting the first component signal and the second component signal, wherein the first component signal propagates through the second conduit and the second component signal propagates through the first conduit;

combining the first component signal with the second component signal to form the main light signal, wherein a net optical path length traveled by the first component signal is approximately equal to a net optical path length traveled by the second component signal; and pulsing the laser on and off with a particular duty cycle in order to time separate at least one parasitic light signal from the main light signal.

* * * * *

UNITED STATES PATENT AND TRADEMARK OFFICE
CERTIFICATE OF CORRECTION

PATENT NO. : 6,609,841 B1
DATED : August 26, 2003
INVENTOR(S) : Jeffrey P. Wilde, Alexander Tselikov and Yongwei Zhang It is certified that error appears in the above-identified patent and that said Letters Patent is hereby corrected as shown below:

Column 5,
Line 7, "$\Delta d_{forwardfiber}$" should read -- $\Delta d_{forward(fiber)}$ --.

Column 8,
Line 5, "$\Delta d$" should read -- $\Delta d$ --.

Column 12,
Line 60, ". . .transforming the second component . . ." should begin a new paragraph, -- transforming the second component. . .--.
Line 61, "said component" should read -- said third component --.

Signed and Sealed this

Nineteenth Day of October, 2004

JON W. DUDAS
*Director of the United States Patent and Trademark Office*